US012588714B2

(12) United States Patent (10) Patent No.: US 12,588,714 B2
Kozlowski et al. (45) Date of Patent: Mar. 31, 2026

(54) ELECTRONIC AEROSOL PROVISION SYSTEM WITH MOVABLE ELECTRICAL CONNECTION PORT

(71) Applicant: eSmoking Institute sp. z o.o., Poznan (PL)

(72) Inventors: Marcin Kozlowski, Poznan (PL); Adrian Jakobczyk, Poznan (PL); Pawel Zielazek, Poznan (PL); Lukasz Grabowski, Poznan (PL); Andrzej Cezary Szykowny, Poznan (PL); Lukasz Milewski, Poznan (PL)

(73) Assignee: ESMOKING INSTITUTE SP. Z O.O., Poznan (PL)

( * ) Notice: Subject to any disclaimer, the term of this patent is extended or adjusted under 35 U.S.C. 154(b) by 840 days.

(21) Appl. No.: 17/250,421

(22) PCT Filed: Jul. 15, 2019

(86) PCT No.: PCT/EP2019/069024
§ 371 (c)(1),
(2) Date: Jan. 19, 2021

(87) PCT Pub. No.: WO2020/016184
PCT Pub. Date: Jan. 23, 2020

(65) Prior Publication Data
US 2021/0267283 A1 Sep. 2, 2021

(30) Foreign Application Priority Data
Jul. 18, 2018 (PL) .......................................... 426350

(51) Int. Cl.
*A24F 40/90* (2020.01)
*A24F 40/42* (2020.01)
(Continued)

(52) U.S. Cl.
CPC .............. *A24F 40/90* (2020.01); *A24F 40/42* (2020.01); *A24F 40/95* (2020.01); *A24F 40/10* (2020.01);
(Continued)

(58) Field of Classification Search
CPC .......... A24F 40/90; A24F 40/42; A24F 40/95; A24F 40/10; A24F 40/20; A24F 40/40; H02J 7/0042
See application file for complete search history.

(56) References Cited

U.S. PATENT DOCUMENTS 8,403,156 B1 3/2013 Boone
D789,750 S 6/2017 Noe et al.
(Continued)

FOREIGN PATENT DOCUMENTS

CN 202340043 U 7/2012
CN 202930971 U 5/2013
(Continued)

OTHER PUBLICATIONS

"International Preliminary Report on Patentability for Application No. PCT/EP2019/069024, completed on Sep. 28, 2020", 7 pages.
(Continued)

*Primary Examiner* — Justin M Kratt
(74) *Attorney, Agent, or Firm* — Merchant & Gould P.C.

(57) ABSTRACT
Described is an aerosol provision device for generating aerosol for user inhalation from an aerosol precursor material, the device including: a housing; electronic circuitry provided within the housing; and an electrical connection port coupled to the electronic circuitry and configured to couple to an external apparatus, wherein the electrical connection port is movably mounted relative to the housing. Also described is an aerosol system, a connection element, and a method for coupling an aerosol provision device.

18 Claims, 8 Drawing Sheets

(51) Int. Cl.

| | |
|---|---|
| *A24F 40/95* | (2020.01) |
| *A24F 40/10* | (2020.01) |
| *A24F 40/20* | (2020.01) |
| *A24F 40/40* | (2020.01) |
| *H02J 7/00* | (2006.01) |

(52) U.S. Cl.

CPC .............. *A24F 40/20* (2020.01); *A24F 40/40* (2020.01); *H02J 7/0042* (2013.01)

(56) References Cited

U.S. PATENT DOCUMENTS

| | | | | |
|---|---|---|---|---|
| 10,251,423 | B2 * | 4/2019 | Mamoun ............. | G05D 7/0676 |
| 2007/0210022 | A1 | 9/2007 | Bianchini | |
| 2014/0007891 | A1 * | 1/2014 | Liu ........................ | A24F 40/40 |
| | | | | 131/329 |
| 2014/0053857 | A1 * | 2/2014 | Liu ...................... | H02J 7/0042 |
| | | | | 131/329 |

| | | | | |
|---|---|---|---|---|
| 2014/0360517 | A1 * | 12/2014 | Taggart ................. | A24F 40/485 |
| | | | | 131/329 |
| 2015/0054465 | A1 | 2/2015 | Liu | |
| 2018/0325171 | A1 * | 11/2018 | Zhu ......................... | A24F 40/60 |

FOREIGN PATENT DOCUMENTS

| | | | |
|---|---|---|---|
| CN | 203574392 | U | 4/2014 |
| CN | 108851230 | A | 11/2018 |
| WO | 2015054862 | A1 | 4/2015 |

OTHER PUBLICATIONS

"International Search Report and Written Opinion received for PCT Patent Application No. PCT/EP2019/069024, mailed on Oct. 17, 2019", 13 pages.

"Search Report received for Poland Patent Application No. 426350, mailed on Nov. 25, 2019", 5 pages.

* cited by examiner

ELECTRONIC AEROSOL PROVISION SYSTEM WITH MOVABLE ELECTRICAL CONNECTION PORT

PRIORITY CLAIM

The present application is a National Phase entry of PCT Application No. PCT/EP2019/069024, filed Jul. 15, 2019, which claims priority from PL Patent Application No. P.426350, filed Jul. 18, 2018, each of which is hereby fully incorporated herein by reference.

FIELD

The present disclosure relates to electronic aerosol provision systems such as electronic cigarettes and the like.

BACKGROUND

Electronic aerosol provision systems such as electronic cigarettes (e-cigarettes) generally contain a reservoir of a source liquid containing a formulation, typically including nicotine, from which a vapor is generated, e.g. through heat vaporization. A vapor source for an aerosol provision system may thus comprise a heater having a heating element arranged to receive source liquid from the reservoir, for example through wicking/capillary action. While a user inhales on the system, electrical power is supplied to the heating element to vaporize source liquid in the vicinity of the heating element to generate a vapor for inhalation by the user. Such systems are usually provided with one or more air inlet holes located away from a mouthpiece end of the system. When a user sucks on a mouthpiece connected to the mouthpiece end of the system, air is drawn in through the inlet holes and past the vapor source. There is a flow path connecting between the vapor source and an opening in the mouthpiece so that air drawn past the vapor source continues along the flow path to the mouthpiece opening, carrying some of the vapor from the vapor source with it in the form of an aerosol. The aerosol exits the aerosol provision system through the mouthpiece opening for inhalation by the user.

In such systems, the vapor source and heating element may be provided in a disposable "cartomizer", which is a component that includes both a reservoir for receiving the source liquid and a heating element. The cartomizer is coupled in use to a reusable part (sometimes referred to as "device" section) that includes various electronic components that can be used to operate the aerosol provision system, such as control circuitry and a battery. The heating element is provided with electrical power from the battery via an electrical connection between the cartomizer and reusable device part. Once the source liquid in the cartomizer is used up (i.e., substantially all the source liquid is vaporized and inhaled), the user replaces the cartomizer and installs a new cartomizer to continue generating and inhaling vaporized liquid.

The reusable part typically includes a battery or power cell which is used to provide power for realizing functions of the e-cigarette, predominately but not limited to, generating aerosol for user inhalation. The battery or cell is usually a rechargeable battery. To recharge the battery or power cell, a power cable is usually connected to the reusable part, through a dedicated charging port which is either accessible from the outer surface of the reusable part or via separating the cartomizer from the reusable part. In addition, some e-cigarettes also include a mechanism for transmitting or receiving data. When this is not implemented via wireless signals, then data transfer is also achieved via a cable.

In some instances, the use of a cable coupled to the e-cigarette may mean that the user experiences some inconvenience when interacting with the e-cigarette as the location of the cable may act as an obstruction for holding the electronic cigarette and generally using or setting down the e-cigarette. Moreover, in cases where the cartomizer is not removed from the reusable part during charging (which may be much more convenient for the user not to disassemble the e-cigarette each time it requires re-charging) the electronic cigarette may experience leakage of the source liquid if the e-cigarette is set down in a certain way.

Various approaches are described which seek to help address some of these issues.

SUMMARY

According to a first aspect the present disclosure provides an aerosol provision device for generating aerosol for user inhalation from an aerosol precursor material, the device comprising: a housing; electronic circuitry provided within the housing; and an electrical connection port coupled to the electronic circuitry and configured to couple to an external apparatus, wherein the electrical connection port is movably mounted relative to the housing.

According to a second aspect the present disclosure provides an aerosol provision system for generating aerosol for user inhalation from an aerosol precursor material, the system comprising: the aerosol provision device of the first aspect; and an aerosol precursor material.

According to a third aspect the present disclosure provides a connection element for an aerosol provision device for generating aerosol for user inhalation from an aerosol precursor material, the connection element including: an electrical connection port configured to couple to an external apparatus, and a movable coupling element configured to movably couple the connection element relative to the housing of the aerosol provision device, wherein the electrical connection port is electrically coupled to electronic circuitry in a housing of the aerosol provision device when the connection element is coupled to the housing of the aerosol provision device.

According to a fourth aspect the present disclosure provides a method for coupling an aerosol provision device for generating aerosol for user inhalation from an aerosol precursor material to an external apparatus, the device comprising a housing, electronic circuitry provided within the housing, and an electrical connection port coupled to the electronic circuitry and configured to couple to an external apparatus, the method comprising: electrically coupling the external apparatus to the aerosol generating device via the electrical connection port, the electrical connection port being in a first position relative to the housing, and moving the electrical connection port to a second position, different from the first position, relative to the housing with the external apparatus electrically coupled to aerosol generating device in the second position via the electrical connection port.

According to a fifth aspect the present disclosure provides an aerosol provision means for generating aerosol for user inhalation from an aerosol precursor material, the means comprising: a housing; electronic circuitry provided within the housing; and an electrical connection means coupled to the electronic circuitry and configured to couple to an external apparatus, wherein the electrical connection means is movably mounted relative to the housing.

It will be appreciated that features and aspects of the disclosure described above in relation to the first and other aspects of the invention are equally applicable to, and may be combined with, embodiments of the disclosure according to other aspects of the disclosure as appropriate, and not just in the specific combinations described above.

BRIEF DESCRIPTION OF THE DRAWINGS

Embodiments of the disclosure will now be described, by way of example only, with reference to the accompanying drawings, in which.

DETAILED DESCRIPTION

Figure 1:
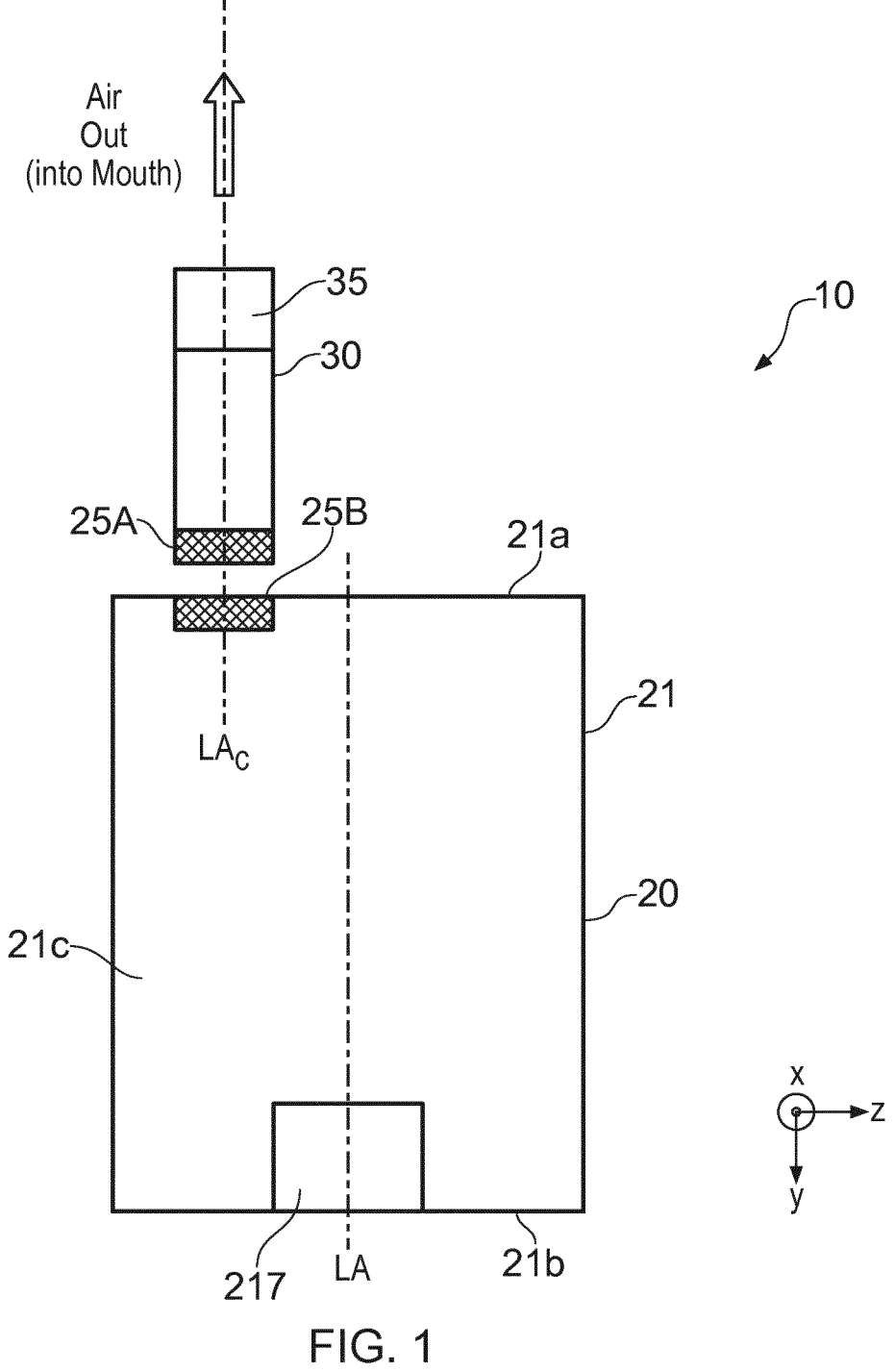
FIG. 1 schematically represents an aerosol provision system in accordance with the principles of this disclosure which includes a movable electrical connection port, and which further includes a cartridge part and a reusable device part in a decoupled state.

Aspects and features of certain examples and embodiments are discussed/described herein. Some aspects and features of certain examples and embodiments may be implemented conventionally and these are not discussed/ described in detail in the interests of brevity. It will thus be appreciated that aspects and features of apparatus and methods discussed herein which are not described in detail may be implemented in accordance with any conventional techniques for implementing such aspects and features.

The present disclosure relates to aerosol provision systems, which may also be referred to as vapor provision systems, such as e-cigarettes. Throughout the following description the term "e-cigarette" or "electronic cigarette" may sometimes be used; however, it will be appreciated this term may be used interchangeably with aerosol provision system and electronic aerosol provision system. Furthermore, and as is common in the technical field, the terms "vapor" and "aerosol", and related terms such as "vaporize", "volatilize" and "aerosolize", may also be used interchangeably. In this regard, means of generating an aerosol other than via a condensation aerosol are envisaged, such as atomization via vibrational, photonic, irradiative, electrostatic means, etc.

The present disclosure relates to an aerosol provision device which includes an electrical connection port that is movably mounted with respect to the housing of the device. The electrical connection port is configured to couple to an external apparatus (such as a power outlet, or a computing device, via an element associated with the external apparatus such as an electrical cable or an electrical connection port of the external apparatus) and is configured to allow electrical power to flow form the external apparatus to the aerosol provision device (or more specifically to a battery thereof for recharging said battery) or to allow information (in the form of electrical signals, such as a modulated electrical signal) to pass from the device to the external apparatus (or vice versa). The present disclosure further provides the electrical connection port such that the electrical connection port can move/rotate relative to the housing of the device, which offers the possibility of setting the electrical connection port at different physical locations relative to the housing. This enables the device and electrical connection port to be placed in certain orientations relative to one another while permitting an electrically conductive cable or the like to be connected to the electrical connection port. In other words, the movable electrical connection port increases the number of available orientations while transferring power or data to/from the device. In addition, the device may also be easily placed in orientations whereby transferring power or data to/from the device is achieved while also preventing (or at least reducing) aerosol precursor material from exiting the aerosol provision system (e.g., leaking out of a cartridge). Hence, the movable electrical connection port permits greater freedom/flexibility to the user when coupling the device to an external apparatus, while also allowing for the reduction in aerosol precursor material leakage.

Figures 2A, 2B:
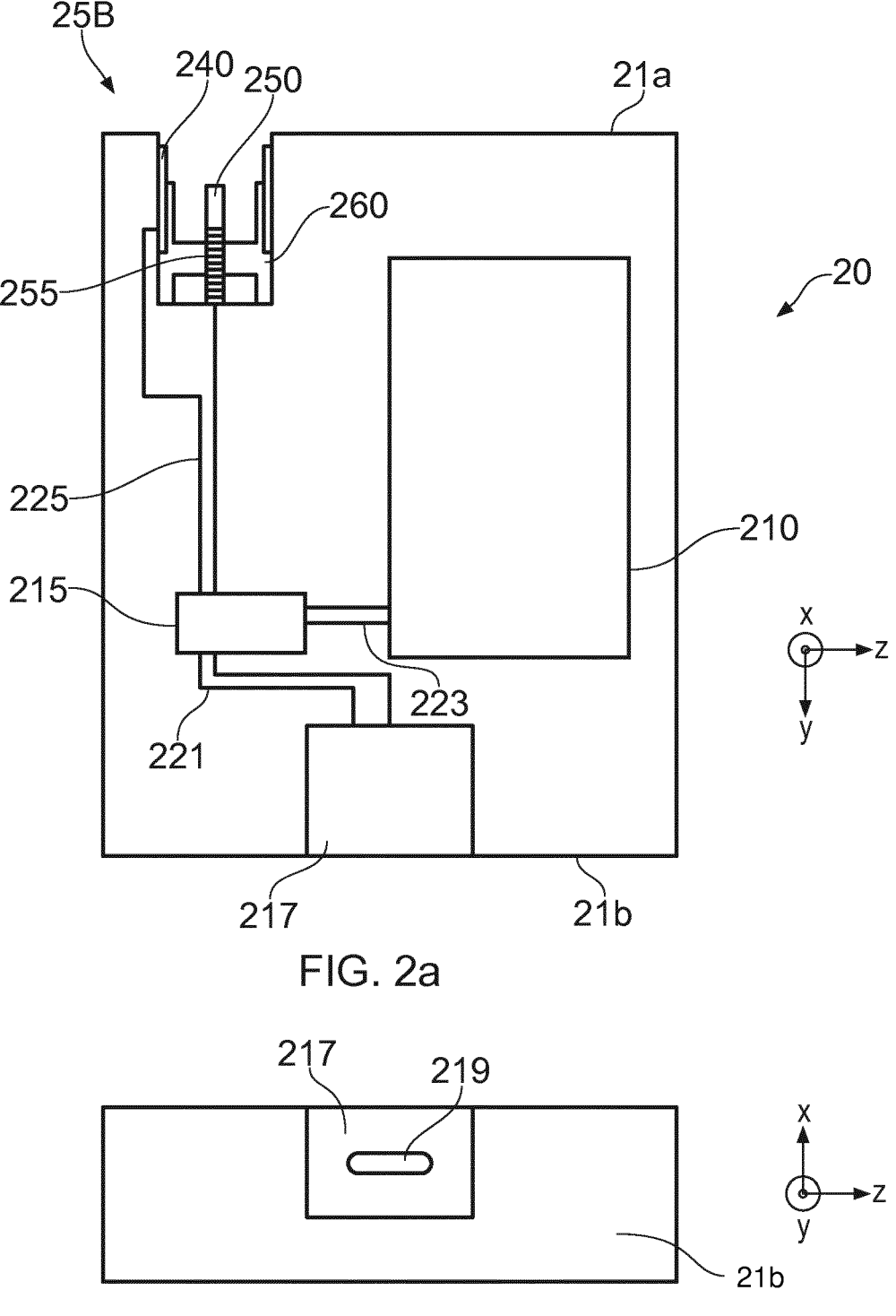
FIG. 2a schematically represents the reusable device part of the aerosol provision system of FIG. 1 in more detail, and specifically in cross-section.
FIG. 2b schematically represents the reusable device part of the aerosol provision system of FIG. 1 in more detail, and specifically the bottom surface thereof when viewed along the longitudinal axis.
Figure 3:
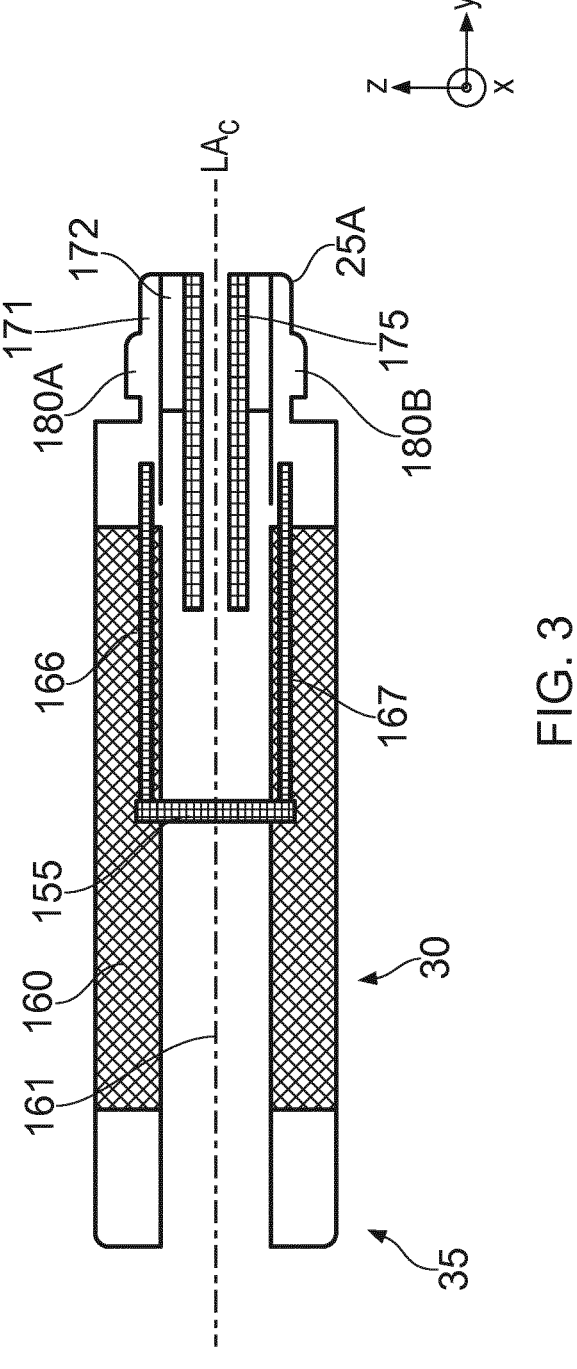
FIG. 3 schematically represents the cartridge part of the aerosol provision system of FIG. 1 in more detail.

FIGS. 1 to 3 are schematic diagrams illustrating aspects of an aerosol provision system 10 in accordance with aspects of the present disclosure. The aerosol provision system 10 comprises an aerosol provision device part 20 (herein device part 20 for brevity) and a cartridge part 30. The cartridge part 30 is arranged to removably couple to the device part 20, as described in more detail below. In FIGS. 1 to 3, the cartridge part 30 is shown decoupled from the device part 20. FIGS. 2a and 2b provide schematic diagrams of the device part 20, with FIG. 2a showing the device part 20 in cross-section when viewed along the depth direction and FIG. 2b showing the bottom surface 21b of the device part 20 when viewed along the longitudinal axis LA, while FIG. 3 provides a schematic diagram of the cartridge part 30 of the aerosol provision system 10 of FIG. 1. Note that various components and details, e.g. such as wiring and more complex shaping, have been omitted from FIGS. 2 and 3 for reasons of clarity.

The cartridge part 30 includes a reservoir 160 containing a liquid aerosol precursor material (sometimes referred to as a source liquid). The source liquid may contain nicotine and/or other active ingredients, and/or a one or more flavors. As used herein, the terms "flavor" and "flavorant" refer to materials which, where local regulations permit, may be used to create a desired taste or aroma in a product for adult consumers. In this example, the cartridge part 30 also comprises a vaporizer (such as a heating element 155, although other vaporization mechanisms may be employed in other implementations) for vaporizing the aerosol precursor material to generate a vapor for inhalation by a user in response to receiving electrical power. The cartridge part 30 also includes a mouthpiece 35 through which the generated vapor may exit the cartridge part 30 and pass to a user's mouth. The mouthpiece 35 is typically the part of the aerosol provision system 10 that the user places in contact with the user's mouth during normal use.

The device part 20 of FIGS. 1 to 3 has a generally cuboidal shape, extending along a longitudinal axis indicated by dashed line LA. FIGS. 1 to 3 are also shown with reference Cartesian axes, which are present for the purposes of explaining various directions only and should not be construed as limiting.

The longitudinal axis LA of the device part 20 extends in the y-direction (and is thus parallel with the y-direction) of FIG. 1. The depth of the device part 20 (i.e., the x-direction extending perpendicular to the plane of FIG. 1) is substantially smaller than the width of the device part 20 (the z-direction from left to right of FIG. 1), which itself is smaller than the length of the device part 20. The device part 20 includes an outer housing 21 having a top surface 21a, a bottom surface 21b, and a side surface 21c. In this implementation, the top surface 21a is intended to be the surface closest to the user's mouth when the user inhales on the mouthpiece 35, while the bottom surface 21b is opposite the top surface 21a and is therefore the surface that is furthest from the user's mouth during normal use. The top surface and bottom surface 21a, 21b may also be referred to as the first and second ends respectively of the housing 20. The bottom surface 21b is generally flat (that is, the bottom surface 21b is all in one plane) for allowing the device part 20 to be placed, upright, on a flat surface such as a table or the like. In other implementations, only a section of the bottom surface 21b may be flat. In the described implementations, upright means that the longitudinal axis of the device part 20 is parallel with the normal of the flat surface on which the device part 20 is placed (e.g., parallel to the normal of the table).

The side surface 21c is the surface which connects the top and bottom surfaces 21a, 21b respectively, and is generally the largest surface of the device part 20. The side surface 21c is considered here as a single surface which is provided around/surrounding the longitudinal axis LA of the device part 20; however, it should be understood that the side surface 21c may be formed of a plurality of individual surfaces that together form the side surface 21c. The cross-section through the housing, i.e., in the x-z plane perpendicular to the line LA, is generally rectangular in this example implementation (see FIG. 2b, for example). In other implementations, however, the housing 20 may take different shapes and/or have different cross-sectional shapes such as elliptical, square, circular, hexagonal, or some other regular or irregular shape as desired. It should be appreciated that in some implementations, the top surface may be omitted (or more accurately, the top surface may be formed by the side surface 21c) depending on the overall shape of the device part 20.

The device part 20 generally includes components with operating lifetimes longer than the expected lifetime of the replaceable cartridge part 30. In the embodiment shown in FIG. 1, the reusable device part 20 and cartridge part 30 are detachable from one another by separating in a direction parallel to the longitudinal axis LA (i.e., the y-direction), but are joined together when the aerosol provision system 10 is in use by a connection, indicated schematically as 25A (on the cartridge part 30) and 25B (on the reusable device part 20), to provide mechanical and electrical connectivity between the reusable device part 20 and the cartridge part 30. The connectors 25A and 25B in this example are used to provide a bayonet fitting for connecting the cartridge part 30 to the reusable device part 20, although other coupling mechanisms may be employed (e.g., screw thread, push fit, etc.). In FIG. 1, it can be seen that the connector 25B is offset from the central longitudinal axis LA of the device part 20; however, the longitudinal axis of the cartridge part 30, labelled LAc in the Figures, when coupled to the connector 25B, is nevertheless parallel with the central longitudinal axis LA. It should be appreciated that in other implementations the longitudinal axis of the cartridge part 30 and the longitudinal axis of the device part 20 may be aligned.

The device part 20 is intended to be used with multiple cartridge parts 30, and hence the device part 20 is said to be reusable. The cartridge part 30 is detached from the reusable device part 20 for replacement of the cartridge part 30 when the supply of source liquid is exhausted or if the user wishes to change the flavor/type of source liquid, and is replaced with another cartridge part 30, if so desired.

The reusable device part 20 includes a power source, such as a battery 210 or cell (e.g., a lithium ion battery) to provide power to the aerosol provision system 10 and control circuitry (discussed in more detail below) for generally controlling various functions of the aerosol provision system 10. When the heating element 155 receives power from the battery (not shown in FIG. 1), as controlled by the control circuitry, the heating element 155 vaporizes the source liquid and this vapor (aerosol) is then inhaled by a user through the mouthpiece 35.

The device part also includes a connection element 217 which includes an electrical connection port 219 (see FIG. 2b). The connection element 217 is movably mounted with respect to the housing 21 (described in more detail below). In the example shown, the connection element 217 is mounted with respect to the housing 21 to permit rotational movement of the connection element 217 relative to the housing 21 (specifically about the z-axis of FIG. 1). The housing 21 may include a recessed portion (not shown) into which the connection element 217 can be located. The recessed portion and the connection element 217 are appropriately shaped to enable rotational movement of the connection element 217. It should be appreciated that the connection port 219 is provided at a fixed location relative to the connection element 217, and so rotation of the connection element 217 relative to the housing 21 also means there is a corresponding rotation of the electrical connection port 219 relative to the housing 21. As will be described in more detail below, the connection port 219 is configured to flexibly permit electrical coupling of the device part 20 to an external apparatus.

Turning now to FIG. 2, the reusable device part 20 includes a battery 210 and control circuitry including a circuit board 215 to provide control functionality for the aerosol provision device, e.g. by provision of a (micro) controller, processor, ASIC or similar form of control chip. The circuit board 215 may be arranged to control any functionality associated with the system 10. By way of non-limiting examples only, the functionality may include the charging or re-charging of the battery 210, the discharging of the battery 210 (i.e., for providing power to the heating element 155), in addition to other functionality such as controlling visual indicators (e.g., LEDs)/displays associated with operational states/status of the device part 20, communication functionality for communicating with external devices, etc. The control chip may be mounted to a printed circuit board (PCB). Note also that the functionality provided by the circuit board 215 may be split across multiple circuit boards and/or across components which are not mounted to a PCB, and these additional components and/or PCBs can be located as appropriate within the aerosol provision device. For example, functionality of the circuit board 215 for controlling the (re) charging functionality of the battery 210 may be provided separately (e.g. on a different PCB) from the functionality for controlling the discharge.

As mentioned above, the device part 20 also includes the connection element 217. The connection element 217 includes an electrical connector (not shown) electrically coupled to the connection port 219 and which is arranged to allow electrical coupling to the control circuitry 215. The electrical connector may be implemented by any suitable means such as wires, traces, contact pads or any combination thereof. FIG. 2a schematically shows wiring 221 passing from adjacent the connection element 217 to the control circuitry 215. The wiring 221 is configured to couple to the electrical connector of the connection element 217 in any suitable manner. For example, the wiring 221 may be electrically coupled to traces on the outer surface of the connection element 217, e.g., via brush contacts. Alternatively, the connection between the connection element 217 and the control circuitry 215 may be implemented through a flexible ribbon connector. Wiring 223 is also provided that electrically couples the control circuitry 215 to the battery 210, thus permitting power transfer between the battery 210 and control circuitry 215. The electrical connection is shown schematically via wires 223 although it should be appreciated that any form of electrical contact between the battery 210 and control circuitry 215 may be employed, e.g., contact pads, and may be determined by the specific application at hand.

The circuit board 215 in the example shown also includes a sensor unit (not shown). If a user inhales on the mouthpiece 35, air is drawn into the aerosol provision system 10 through one or more air inlet holes (not shown in FIGS. 1 and 2). The sensor unit, which may include a pressure sensor and/or microphone, detects this airflow, and in response to such a detection which signifies the user is inhaling on the mouthpiece 35 of the system 10, the circuit board 215 provides power from the battery 210 to the heating element 155 in the cartridge part 30 (this is generally referred to as puff actuation). In other examples, the aerosol provision system 10 may be provided with a button or switch on the housing of the device part 20 that a user can operate to supply power from the battery (via the control circuitry 215) to the heating element 155. In FIG. 2a, control circuitry 215 is coupled to connector 25B via wiring 225, although any form of suitable electrical coupling may be used. The control circuitry is configured to control the power supplied to the connector 25B (and thus to the heating element 155). For example, the control circuitry may employ pulse width modulation (PWM) to control the power supplied to the heating element 155.

Turning now to FIG. 3, the cartridge part 30 includes an air passage 161 extending along the central (longitudinal) axis LAc of the cartridge part 30. The air passage 161 extends from the mouthpiece 35 to the connector 25A, which joins the cartridge part 30 to the device part 20. The air passage 161 is fluidly coupled to one or more air inlets (not shown) when the cartridge part 30 is coupled to the device part 20. The air inlets permit air from the external environment of the system 10 to be drawn into the system 10 and along air passage 161 in response to a user inhaling at mouthpiece 35. The air inlet(s) may be provided in the device part 20 or cartridge part 30, or may be formed as a result of coupling the cartridge part 30 to the device part 20.

The cartridge part 30 in the implementation shown is generally cylindrical, although it should be appreciated that the cartridge part 30 may take any suitable shape in other implementations. The reservoir of source liquid 160 is provided around the air passage 161. This reservoir 160 may be implemented, for example, by providing cotton or foam soaked in the source liquid, or the source liquid may be held freely within a suitable container. The heating element 155 is, in this example, a resistance wire (such as a Nichrome wire) wrapped around a wicking material or similar facility to transport liquid from the reservoir 160 to the resistance wire. The wicking material may be any suitable material to perform a wicking function, e.g., cotton, ceramic, glass fibers, etc. The heating element 155 is powered through lines 166 and 167, which are in turn connected to opposing polarities (positive and negative, or vice versa) of the battery 210 via connector 25A.

Although not shown in FIG. 3, the cartridge part 30 may include a heating element temperature sensor, such as a resistance temperature detector (RTD), configured to sense a temperature of the heating element 155. The heater temperature sensor is disposed in the cartridge part 30 but coupled to the circuit board 215, e.g., through connectors 25A and 25B. Accordingly, the circuit board 215 is able to control the power supplied to the heating element 155 based on the derived temperature of the heating element 155. In other implementations, however, the temperature of the heating element 155 may be obtained without using a separate temperature sensor, e.g., via determining the electrical resistance of the resistance wire.

As mentioned above, the connectors 25A and 25B provide mechanical and electrical connectivity between the reusable device part 20 and the cartridge part 30. As seen in FIG. 2a, the connector 25B includes two electrical terminals, an outer contact 240 and an inner contact 250, which are separated by insulator 260. The connector 25A likewise includes an inner electrode 175 and an outer electrode 171, separated by insulator 172 (as seen in FIG. 3). The insulators 260 and 172 may be formed from any suitable electrically insulating material, e.g., silicone. When the cartridge part 30 is connected to the reusable part 20, the inner electrode 175 and the outer electrode 171 of the cartridge part 30 mechanically (and hence electrically) engage the inner contact 250 and the outer contact 240 respectively of the reusable device 20. The inner contact 250 is mounted on a coil spring 255 so that during the mating (connection) process, the inner electrode 175 pushes against the inner contact 250 to compress the coil spring 255, thereby helping to ensure good mechanical and electrical contact when the cartridge part 30 is connected to the reusable part 20.

The connector 25A of FIG. 3 is also provided with two lugs or tabs 180A, 180B, which extend in opposite directions away from the longitudinal axis of the aerosol provision device. These tabs are used to provide the bayonet fitting for connecting the cartridge part 30 to the reusable device part 20. As mentioned above, however, any suitable form of mechanical and electrical coupling between connector 25A and 25B may also be used in accordance with the principles of the present disclosure.

Figure 4:
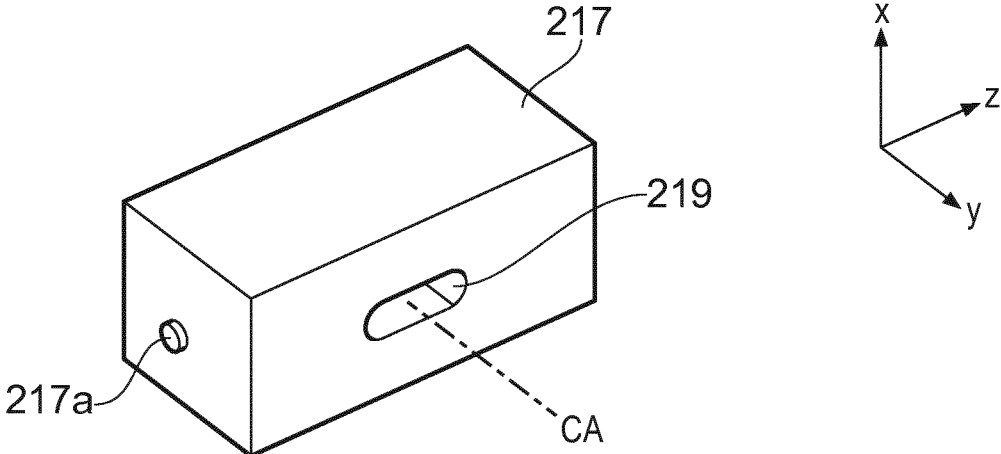
FIG. 4 schematically represents the connection element of the aerosol provision system of FIG. 1 in more detail.

As mentioned above, the electrical connection port 219 is configured to move relative to the housing 21 of the device part 20, via the connection element 217. FIG. 4 shows an example connection element 217 according to the described implementation. The connection element 217 in this implementation has a cuboidal shape with the connection port 219 provided on one of the faces of the cuboid having a larger surface area. The electrical connection port 219 has a connection axis CA, which is described in more detail below. As stated above, the connection element 217 includes some mechanism that permits movement of the connection element 217 relative to the housing 21 (this may be referred to herein as a housing coupling element). In the implementation described, the connection element 217 includes two protrusions 217a that each protrude from opposite surfaces of the connection element (specifically the surfaces having the smaller surface area). In FIG. 4, only one protrusion 217a is shown, however it should be appreciated that a similar protrusion 217a extends on the opposite side of the connection element 217. The protrusions 217a protrude in the direction of the central longitudinal axis of the connection element 217. The protrusions 217a are arranged to mate with corresponding recesses provided in the recessed portion of the housing 21 of the device part 20 in such a way that the connection element 217 is able to move relative to the housing 21. More specifically, the protrusions 217a enable rotation of the connection element 217 about the z-axis of the connection element 217, specifically in a direction that extends from the y-axis to the x-axis, or vice versa.

The recesses may have dimensions slightly greater than the protrusions 217a to help reduce any friction between the recesses and the protrusions 217a, but at the same time, the recesses are arranged to prevent movement of connection element 217 in the x- and y-directions in normal use (thus retaining the connection element 217 in the recessed portion of the housing 21). The recessed portion of the housing 21 is sized so as to enable rotation of the connection element 217 in the housing 21, for example the recessed portion may have dimensions slightly larger than the connection element 217 and a generally rounded shape such that the corners/edges of the connection element 217 do not interfere with the recessed portion of the housing 21 during rotation of the connection element 217. It should be appreciated that the above is one example of a suitable connection element 217 and the connection element 217 may take any suitable shape and be formed of any suitable material, e.g., a plastics material. Moreover, the protrusions may be position differently (e.g., offset from the longitudinal axis) and/or may be formed as a separate component to the connection element (e.g., such as a spindle/axle that can pass through connection element).

Figure 5A:
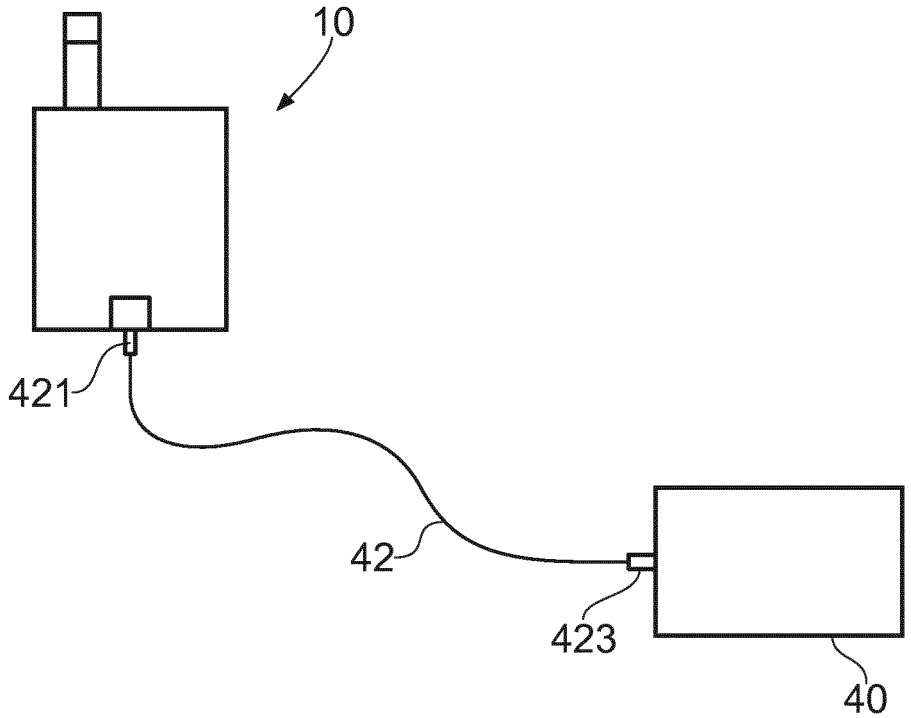
FIG. 5a schematically represents the aerosol provision system of FIG. 1 where the cartridge part and the device part are coupled together, and wherein an external apparatus is coupled to the aerosol provision system.

The electrical connection port 219 is arranged to couple to an external apparatus 40 via an element associated with the external apparatus 40. FIG. 5a shows a schematic diagram of an aerosol provision system 10 coupled to an external apparatus 40. The external apparatus 40 is coupled to the aerosol provision system via an electrically conductive cable 42. The cable 42 in FIG. 5a includes a first end 421 coupled to the electrical connection port 419 of the aerosol provision system 10 and a second end 423 coupled to the external apparatus 40. The external apparatus 40 may be any suitable entity that is configured to provide or receive power and/or to provide and receive data in the form of electrical signals.

In the described implementation, the external apparatus 40 is a power source, e.g., such as a mains power socket. The connector 423 in this example is a socket configured to couple to the mains power socket (or is connected to an adapter configured to be received in the mains power socket). Electrical power is configured to be supplied to the control circuitry 215 and/or battery 210 of the aerosol provision device 20 from the external apparatus 40 via the electrical connection port 219, e.g., to (re) charge the battery 210.

Figure 5B:
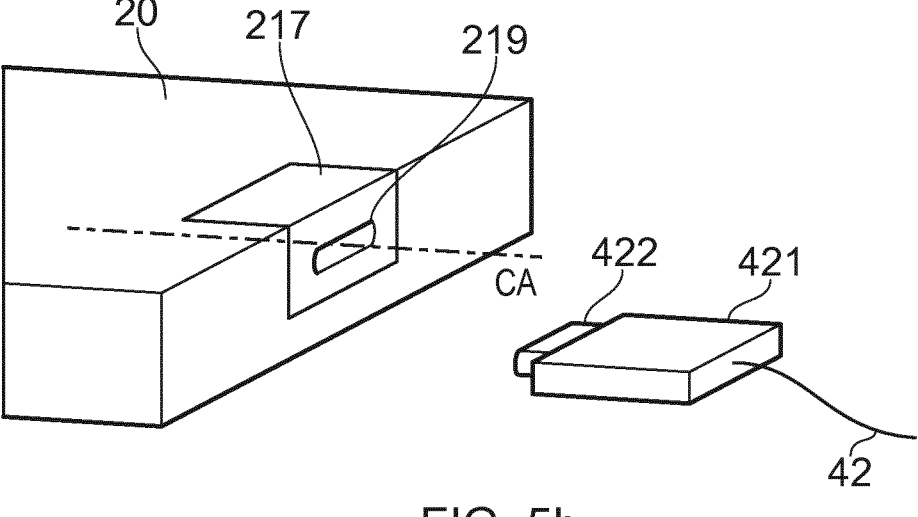
FIG. 5b schematically represents the bottom surface of the device part and the first end of a cable coupled to the external apparatus but prior to coupling with the aerosol provision system of FIG. 1.

FIG. 5b schematically shows the electrical connection port 219 and the first end 421 of the cable prior to connection. The first end 421 of the cable 42 is configured to couple to the electrical connection port 219. In the implementation shown, the electrical connection port 219 is a female connector (i.e., a recessed port extending into the connection element 217) while the first end 421 of the cable 42 includes a male connector 422 (i.e., a protrusion extending from the first end 421 of the cable 42). The male connector 422 is electrically coupled to the electrical connection port 219 by inserting the male connector 422 into the connection port 219 along the connection axis CA. The connection axis CA is generally parallel with the longitudinal extent of the connection port 219. The connection port 219 is flush with the surface of the connection element 217 and hence does not protrude from the housing 21, which means that there is less chance of catching the connection port 219 e.g., on clothing or the like during use of the aerosol provision system 10 when the cable 42 is not connected and also means that the device part 20 includes a generally flat bottom surface 21b that allows the device part 20 to be stand unhindered on a flat surface, e.g., such as a table when the cable 42 is not connected.

Such connectors may be of any suitable type, such as USB, microUSB, a DC connector, etc. It should also be appreciated that the connectors may be reversed in some implementations. That is, the connection port 219 may be a male connector, while the first end 421 of the cable 42 may comprise a female connector.

Figures 6A, 6B, 6C:
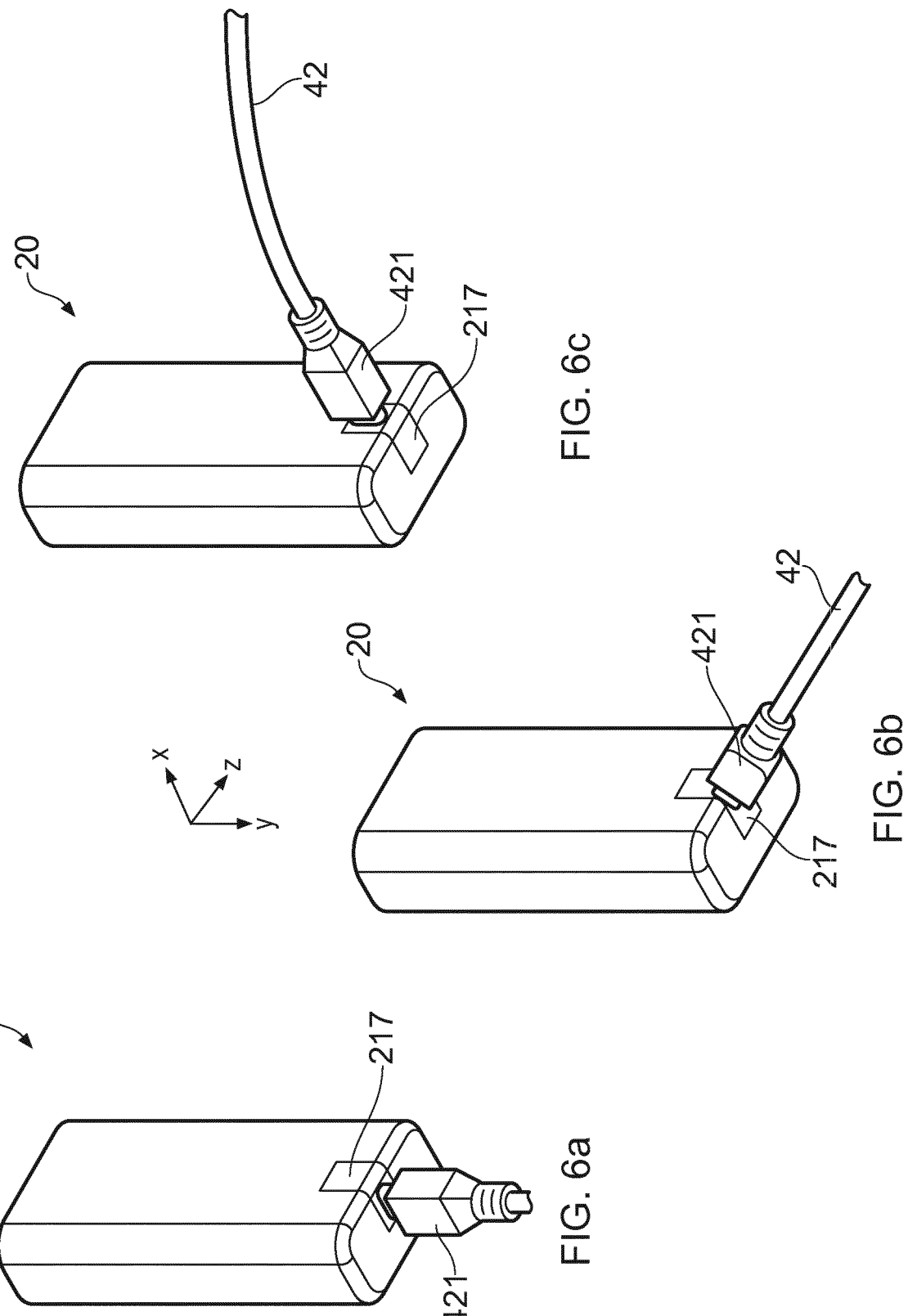
FIGS. 6a to 6c schematically represent the connection element and connection port of the aerosol provision system of FIG. 1 at different positions relative to the housing; specifically, FIG. 6a schematically shows the connection port at a first position where the connection port is parallel with the longitudinal axis of the device part, FIG. 6c schematically shows the connection port at a second position where the connection port is orthogonal to the longitudinal axis of the device part, and FIG. 6b which schematically shows the connection port rotated to a position between the first and second position.

FIGS. 6a to 6c schematically show the device part 20 when coupled to the cable 42 with the connection element 217 in different positions. FIGS. 6a to 6c show only the device part 20; however, it should be appreciated that the cartridge part 30 may be coupled to the device part 20 when the cable 42 is connected thereto. FIGS. 6a to 6c are also shown with the same reference axes as in FIGS. 1 to 3.

In FIG. 6a the connection element 217 is in a first position where the connection axis CA of the connection port 219 is approximately parallel with the longitudinal axis LA of the device part 20. That is, the connection axis CA is parallel to the y-direction. In this position, the first end 421 of the cable 42 is also approximately parallel to, or parallel to, the longitudinal axis of the device part 20.

FIG. 6c shows the connection element 217 in a second position where the connection axis CA of the connection port 219 is approximately orthogonal with the longitudinal axis LA of the device part 20. That is, the connection axis CA is parallel to the x-direction. In this position, the first end 421 of the cable 42 is also approximately orthogonal with the longitudinal axis of the device part 20. FIG. 6b shows the connection element 217 in a position between the first and second positions of FIGS. 6a and 6c respectively. In this position, the connection axis CA is neither parallel with nor orthogonal to the longitudinal axis LA of the device part 20 but is set at an angle between 0° and 90° with respect to the longitudinal axis LA/y-axis of the device part 20—in FIG. 6*b* the connection axis CA is approximately at 45° with respect to the y-axis.

It should be appreciated that by rotating the connection element 217 about the z-axis, the connection axis CA of the connection port 219 can be set to any position as desired between 0° and 90° degrees with respect to the y-axis/ longitudinal axis LA of the device part 20. That is, the connection port 219 can be moved relative to the housing 21 to a position in which the axis of connection is non-parallel with the longitudinal axis LA of the housing 21.

Generally, to transition from the first position to the second position, the connection element 217 is rotated 90° about the z-axis of the connection element 217, passing from the first position as shown in FIG. 6*a*, through the position shown in FIG. 6*b*, to the second position shown in FIG. 6*c*. This may be defined as rotating the connection element 217 in a first direction (which can be considered an anticlockwise rotation when viewing the device part 20 along the positive z-direction). Conversely, to transition from the second position to the first position, the connection element 217 is rotated 90° about the z-axis of the connection element 217, passing from the second position as shown in FIG. 6*c*, through the position shown in FIG. 6*b*, to the first position shown in FIG. 6*a*. This may be defined as rotating the connection element 217 in a second direction (which can be considered a clockwise rotation when viewing the device part 20 along the positive z-direction).

Although FIGS. 6*a* to 6*c* do not show the cartridge part 30, the following description will assume the cartridge part 30 is coupled to the device part 20. As has been described above, the cartridge part 30 includes a reservoir 160 containing a liquid aerosol precursor material. Although in many cases efforts have been made to reduce the leakage of such a liquid aerosol precursor material from the reservoir 160, leakage of the liquid from the reservoir 161 may nevertheless still occur. This effect may be increased particularly when the cartridge part 30 is maintained for a prolonged period of time in an orientation that is not an orientation that may be associated with normal use of the aerosol provision system 10. With reference to FIG. 3, the source liquid generally travels from the reservoir 160 to the heating element 155 via the wicking material of the heater element 155, but this action may also be influenced to some extent by the force of gravity. During normal use, the cartridge part 30 is generally orientated such that the mouthpiece 35 is at a position that is above the connector 25A. By way of example only, one might consider a normal orientation of the cartridge part 30 to be one in which the longitudinal axis LAc is within +45° of the direction of the gravitational force acting on the cartridge part 30 (although it should be appreciated that this is purely by way of example only and other cartridge parts 30 may be designed to function at greater or lesser angular ranges than stated above). However, broadly speaking, the cartridge part 30 is in an orientation in which the source liquid flows from the mouthpiece end towards the connector end of the cartridge part 30.

However, when the cartridge part 30 is held in a non-normal orientation, the flow of source liquid may be different from that during normal use. Parts of the cartridge part 30 that normally do not contact the source liquid, or parts of the cartridge part 30 that are not normally exposed to a liquid flow of that strength/direction are subsequently exposed to flow conditions that would not be expected in normal use. For example, the flow of liquid through the wicking material of the heating element 155 may be altered because of the change in source liquid flow. This may lead to leakages of source liquid through these parts of the cartridge part 30. In open systems, in which the reservoir 160 is re-fillable by a user, overfilling of the reservoir 160 may also lead to parts of the cartridge part 30 being exposed to source liquid when in a non-normal orientation.

Because cartridge parts 30 are generally replaced routinely, manufactures of such cartridge parts 30 may employ trade-offs between a sealing efficiency/degree versus a cost in goods. Providing dedicated sealing components in a cartridge part 30 can increase the number of components in the cartridge part 30 and thus cost of goods/manufacture. Thus some manufactures may choose to limit the degree of sealing with respect to parts of the cartridge part that are not normally exposed to liquid flow. In other cases, while the cartridge parts 30 may generally be configured to reduce leakage as much as possible, components that are not normally exposed to liquid flow (either at all or of a certain type/strength/direction) may not be tested during manufacture to the same extent as components that are normally exposed to liquid flow, e.g., through an effort to keep the costs of the disposable cartridge parts 30 down. In both cases, this may mean that leakage occurs readily through these components or, more likely, that variations in liquid flow that are relatively short (e.g., a deviation from a normal position for less than a few minutes, e.g., around 2 to 5 minutes) may not lead to noticeable leakage. However, when placed in non-normal orientations for prolonged periods of time, then noticeable leakage may occur.

Therefore, the present disclosure provides an aerosol provision system 10 designed to account for the problems mentioned above. In particular, and with reference to FIGS. 6*a* to 6*c*, the aerosol provision system 10 can be generally maintained in a normal orientation even when an external apparatus is coupled to the aerosol provision system.

In the first position as shown in FIG. 6*a*, the device part 20 is provided in an orientation whereby the longitudinal axis LA is approximately parallel with the direction of gravity (in other words, FIG. 6*a* is representative of a normal orientation). In this position, a user may be free to use the aerosol provision system 10 as they normally would, even when the cable 42 is connected to the device part 20, e.g., when charging the battery 210 or providing power to the aerosol provision system 10. For instance, in use, the user generally holds the aerosol provision system 10 with the palm of their hand in contact with the side surface 21*c* and their digits wrapped around remaining parts of the side surface 21*c*. Accordingly, the cable 42 when connected to the connection port 219 in the first position is connected in a way that does not interfere with how the user holds the device part 20 in normal use. Therefore, even when the cable 42 is connected, the user may use the device part 20 as normal, e.g., they may inhale on the mouthpiece 35 of cartridge part 30 to inhale generated aerosol.

In the second position as shown in FIG. 6*c*, the connection port 219 is provided at a position that enables the connection of the cable 42 along an axis which is not parallel with (but is orthogonal to) the longitudinal axis of the device part 20. The connection port 219 is provided on the side surface 21*c* and not the bottom surface 21*b* of the device part 20, as in FIG. 6*a*. This enables the bottom surface 21*b* to be set to a state in which it is free of the connection port 219. Accordingly, the bottom surface 21*b* can be made substantially flat, even when the cable 42 is connected to the device part 20.

This enables the aerosol provision system 10 to be placed, without a user physically supporting the system 10, in a normal orientation. For instance, this could be by placing the bottom surface 21b of the device part 20 on a flat surface, such as a table or the like. Hence, in the second position of the connection element 217, the cartridge part 30 can be maintained in a normal orientation while the cable 42 is connected to the connection port 219, without physical support from a user. In view of the discussion above, this has been found to help reduce leakage of the liquid source from the reservoir 160 because the reservoir is maintained in a normal position.

That is, in summary, the electrical connection port 219 is configured to be movable from a first position (i.e., that shown in FIG. 6a) where the electrical connection port 219 forms part of the bottom surface 21b of the housing 21 to a second position where the electrical connection port 219 forms part of the side surface 21c of the housing 21. In this regard, the electrical connection port 219 is provided either on the bottom surface 21b (where the connection axis CA is parallel to the normal of the bottom surface 21b, or a flat section thereof) or on the side surface 21c (where the connection axis CA is parallel to the normal of the side surface 21c, or a section thereof). In the example shown, when the connection port 219 is in the first position, the connection axis CA is parallel with the longitudinal axis LA, but when in the second position, the connection axis CA is orthogonal to the longitudinal axis LA of the housing 21. However, it should be appreciated that whether or not the connection axis CA is parallel or orthogonal to the longitudinal axis LA may depend on the shape of the device part 20 and the surfaces 21b and 21c thereof.

Figures 7A, 7B:
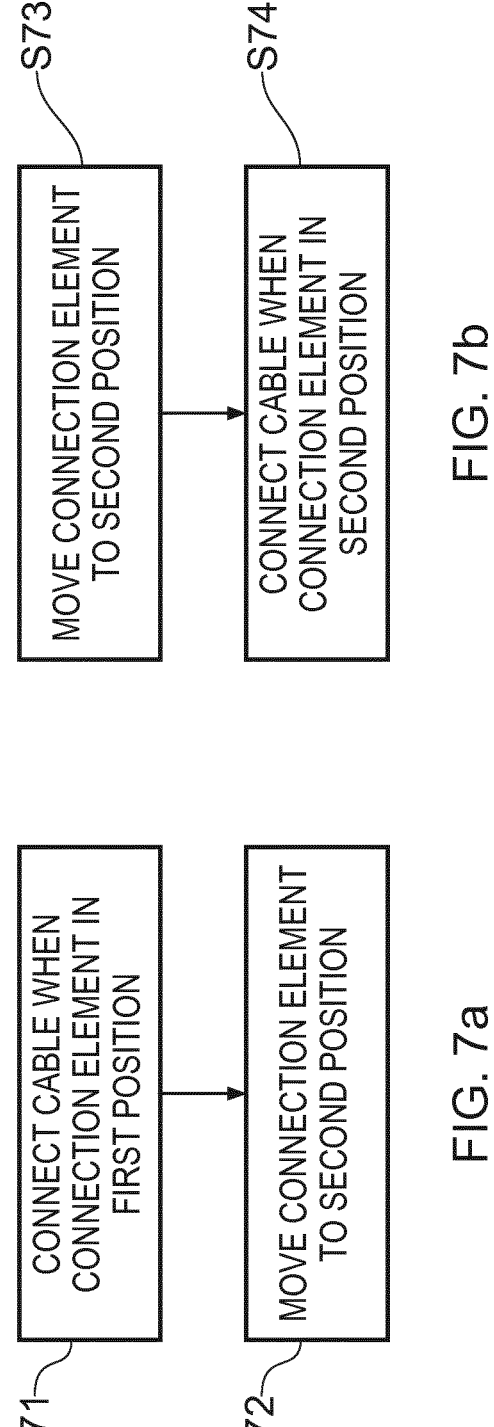
FIG. 7a is a method representing a first way of connecting the external apparatus to the aerosol provision system of FIG. 1.
FIG. 7b is a method representing a second way of connecting the external apparatus to the aerosol provision system of FIG. 1.

FIGS. 7a and 7b show example methods of connecting the external apparatus 40 to the device part 20 as described above. In FIG. 7a, the external apparatus 40 is first connected to the electrical connection port 219 at S71. At S72, the connection element 217 is moved to the second position relative to the housing 21 in the event that the user wishes to set the device to the second position, e.g., to place the device down for charging. In FIG. 71b, the connection element 217 is first moved to the second position from the first position at S73. Then at S74, the external apparatus is connected to the electrical connection port 219.

Devices with a fixed connection port do not provide the same degree of flexibility. For example, a connection port fixed in the first position e.g., as shown in FIG. 6a cannot be placed in a normal orientation on a flat surface, such as a table. Instead, such a device would have to be rested on its corresponding side surface, resulting in a non-normal orientation of the cartridge part. The user would either have to physically support the device part in some manner or remove the cartridge part when a cable is connected to the fixed connection port. Conversely, a connection port fixed in the second position e.g., as shown in FIG. 6c would lead to inconvenience for a user should they wish to use the device with a cable connected to the fixed connection port.

Therefore, the present disclosure provides a movable connection port 219 which permits greater flexibility for using and/or positioning the aerosol provision system 10 when a cable 42 is connected, or to be connected, thereto.

In the event that the cartridge part 30 is coupled to the device part 20, the movable connection port 219 offers the ability to continue using the aerosol provision system when it is set to one position, and to offer the ability to position the aerosol provision system such that the reservoir 160 of the cartridge part 30 is provided in a normal orientation without a user physically supporting the aerosol provision system 10. As mentioned, this enables the cartridge part 30 to be maintained in a normal orientation for a prolonged period of time, e.g., while the battery 210 is being charged, without increasing the chance of leakage of the source liquid from the reservoir 160.

However, it should be understood that the movable connection element 217 also offers the user greater flexibility even in the event that the cartridge part 30 is not present. In this scenario, the device part 20 can be put in the first or second position depending on the user's preference, and/or the available surface on which the device part 20 may be placed (e.g., based on the relative distance between the surface and the external apparatus 40 and the length of the associated cable 42, or the area of the surface available for placing the device part 20). Therefore, in this instance, the user is provided with the flexibility to choose how the connection port 219 is orientated and thus how the device part 20 can be placed on a surface, e.g., for charging. It should also be mentioned that for some device parts 20, a user may be able to perform certain functions even when the cartridge part 30 is not present—for example, the user may be able to program certain operations of the device part 20, view usage statistics or other statistics associated with the device part 20, etc. Hence, there may also be a desire to be able to hold the device part 20 without obstruction from an attached cable.

It has been described above that the connection element 217 is specified as being rotatable around the z-axis thereof by an amount between 0° to 90°. However, it should be appreciated that connection element 217 may be rotatable by a lesser or greater extent depending on the application at hand and the design of the aerosol provision system. In some implementations, stopper portions (which may abut the edges or purposefully positioned protrusions of the connection element at certain rotational angles of the connection element) may be provided to limit the maximum rotation of the connection element 217 to a certain range and prevent the user from moving the connection element outside of this range.

In some implementations the rotation of the connection element 217 may be relatively easy whereas in other implementations the rotation of the connection element 217 may be relatively difficult. By easy or difficult, we refer to the force required to cause an incremental movement of the connection element, e.g., from the connection axis at 45° angle to the longitudinal axis LA to the connection axis at a 50° angle. In other words, this can be considered as the relative resistance to rotation. In some applications, a relatively low resistance to rotation may be beneficial, e.g., to account for changes in the movement of the device part 20 when the user is using the aerosol provision system 10. By way of example, suppose the device part 20 is in the first position of FIG. 6a. To reduce the stress on the cable 42, if there should be a relative movement of the device part 20 relative to the external apparatus that would otherwise be accommodated by a deformation of the cable 42, the connection element 217 may rotate instead (e.g., to the position shown in FIG. 6b) to account for this relative movement. In other cases, a relatively large resistance to rotation may be desired to prevent changes from the first position to second position and/or to reduce wear on the electrical traces of the connection element 217 or wires 221.

It should also be appreciated that the connection element 217 is specified as taking a first position and a second position. In some implementations, the connection element 217 may be provided with locking features enabling the connection element 217 to be locked in the first position or in the second position. For instance, the user may be required to unlock the connection element 217 in order to move it to a different position. This could be via a simple series of recesses and protrusions which are separated by application of a pre-determined force by a user on the connection element 217. The connection element 217 may include a feature, such as an indentation, for allowing the user to grip the connection element 217 with their finger(s). Alternatively, the connection element 217 may be provided with a separate lock mechanism, such as a slidable locking member.

Figure 8:
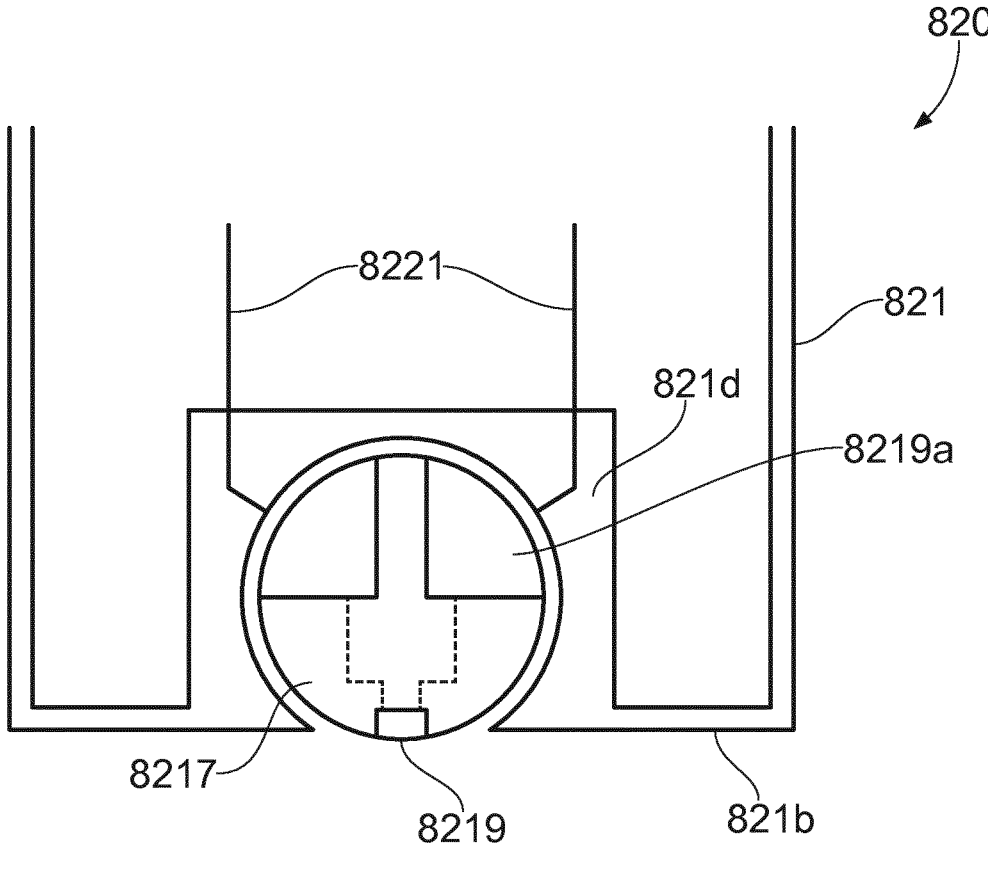
FIG. 8 schematically represents a second implementation of an aerosol provision system in accordance with the principles of this disclosure which includes a movable electrical connection port, and which further includes a cartridge part and a reusable device part in a decoupled state.

In has been described above that the connection element 217 is configured to rotate about the z-axis thereof. However, it should be appreciated that in other implementations, the connection element may be configured to rotate about two or three axes. FIG. 8 schematically represents such an implementation where the connection element 8219 is configured to rotate about a plurality of axes. The implementation shown in FIG. 8 is the same as described with regards to FIGS. 1 to 7, with the exception of several additional or altered features. Only the additional or altered features will be described herein in the interests of brevity.

FIG. 8 schematically shows a device part 820 in cross section. More complex wiring/shaping has been omitted for reasons of clarity. The device part 820 includes a housing 821, including a bottom surface 821*b*. The housing also includes a section 821*d* which defines a spherical recessed portion in which is located a spherical (or substantially spherical) connection element 8217. The connection element 8217 includes a connection port 8219 which is essentially the same as connection port 219. The connection element 8217 includes electrical traces (shown in dashed lines) connected to the connection port 8219 at one end, and to electrical contact pads 8219*a* at the other end. The electrical contact pads 8219*a* are provided on a part of the surface of the connection element 8217. Wires 8221 (which connect to control circuitry 215) are provided so as to respectively connect to the electrical contact pads 8219*a*. For example, the ends of the wires 8221 may be provided with brushes or the like for electrically contacting the pads 8219*a*. The pads and wires are provided at positions such that each wire is connected to a contact pad even in the event of rotation. For instance, the contact pads may cover a quarter of the surface of the connection element 8217 and the ends of the wires may be provided spaced 90° from each other and roughly in the center of the connection pads 8219*a* when the connection port 8219 is parallel with the connection axis CA.

In this implementation, it should be appreciated that as the ball like connection element 8217 rotates in the spherical recessed portion, electrical contact is maintained with the electrical contact pads 8219*a* even in the event of rotation about any of the three axes. The described implementation has some limitations based on the size of the contact pads for example. However, this type of arrangement offers further flexibility to the user when using the device part 820, particularly when in the first position (as shown by FIG. 6*a*). Hence, the principles of the present disclosure are not limited to rotation about one axis.

It has also been described above that the external apparatus 40 is a power source for providing power to the aerosol provision system 10, e.g., for charging battery 210. However, in some instances, the external apparatus 40 may be any device capable of receiving or transmitting electronic information or data, such as a personal computer, tablet device, smartphone, etc. In these cases, the cable 42 is arranged to enable information/data, in the form of electrical signals, to be passed from the control circuitry 215 of the device part 20 to the external apparatus 40, and/or from the external apparatus 40 to the control circuitry 215. Such data may include, but is not limited to, usage data, data about the device part 20 such as model number, batch number, etc., date of manufacture, data associated with the cartridge part 30, etc. Hence, when the cable 42 is connected to the aerosol provision system 10, data may be transferred between the system 10 and the external apparatus 40 accordingly. This data transfer may be initiated by a user or automatically, and may be intermittent or continuous dependent on the application at hand. Accordingly, as in the case with power transfer, the aerosol provision system 10 can be placed in position such that the system 10 is in a normal orientation when the cable 42 is connected thereto. It should also be understood that the function of data transfer does not necessarily need to be exclusive to power transfer. In other words, a cable 42 may be coupled to both a device capable of transmitting/receiving data as well as transmitting power, e.g., such as a personal computer. These functions may be performed simultaneously or in sequence.

It has also been described above that cartridge part 30 includes a liquid reservoir containing a source liquid which acts as a vapor/aerosol precursor. However, in other implementations, the cartridge part 30 may contain other forms of aerosol precursor material, such as tobacco leaves, ground tobacco, reconstituted tobacco, gels, etc. In accordance with the principles of the present disclosure described herein, while the degree to which more solid/gel type aerosol precursor materials may exit the cartridge part 30 when the cartridge part 30 is not in a normal orientations may be relatively less, the disclosure nevertheless applies to any form of aerosol precursor materials. That is, the present disclosure relates to non-combustible aerosol provision systems such as heating products that release compounds from substrate materials without burning the substrate materials, such as electronic cigarettes, tobacco heating products, and hybrid systems to generate aerosol from a combination of substrate materials. The substrate materials, sometimes referred to herein as aerosol precursor materials or aerosolizable materials, may include any of a liquid, a gel or a solid substrate.

It should also be understood that cartridge parts 30 may be provided with combinations of aerosol precursor materials. It should be appreciated that any suitable type of vaporization element/heating element may be selected in accordance with aspects of the present disclosure, e.g., a wick and coil, an oven-type heater, an LED type heater, a vibrator, etc.

It has also generally been described above that the cartridge part 30 includes a heating element 155 (or more generally a vaporization element). Such cartridge parts 30 may be referred to as "cartomizers". However, in other implementations, the vaporization element may be partially or fully located within the device part 20 and is configured such that the reservoir 160 is in fluid communication with the vaporizer when the cartridge part 30 and device part 20 are coupled together.

In other implementations, the cartridge part 30 may be omitted and instead the device part 20 may be provided with an aerosol precursor material reservoir which can receive a quantity of aerosol precursor material directly. For example, the device part may include a reservoir having a removable cap (e.g., a threadingly engaged cap) which enables source liquid to be inserted into the device part 20. (Or an alternative way to view such implementations is that the cartridge part 30 is integrated with the device part 20). The present disclosure also applies to such vapor provision systems 10.

Thus there has been described an aerosol provision device for generating aerosol for user inhalation from an aerosol precursor material, the device comprising: a housing; electronic circuitry provided within the housing; and an electrical connection port coupled to the electronic circuitry and configured to couple to an external apparatus, wherein the electrical connection port is movably mounted relative to the housing.

While the above described embodiments have in some respects focused on some specific example aerosol provision systems, it will be appreciated the same principles can be applied for aerosol provision systems using other technologies. That is to say, the specific manner in which various aspects of the aerosol provision system function are not directly relevant to the principles underlying the examples described herein.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein, and it will thus be appreciated that features of the dependent claims may be combined with features of the independent claims in combinations other than those explicitly set out in the claims. The disclosure may include other inventions not presently claimed, but which may be claimed in future.

The invention claimed is:

1. An aerosol provision device for generating aerosol for user inhalation from an aerosol precursor material, the aerosol provision device comprising:
a housing;
electronic circuitry provided within the housing; and
an electrical connection port coupled to the electronic circuitry and configured to directly couple to an external apparatus, wherein the electrical connection port is rotatably mounted relative to the housing, and wherein the housing includes a bottom surface and a side surface connected to the bottom surface, wherein the electrical connection port is configured to be movable from a first position where the electrical connection port forms part of, and is flush with, the bottom surface of the housing to a second position where the electrical connection port forms part of, and is flush with, the side surface of the housing, and
wherein the aerosol provision device comprises a reservoir or is configured to couple to a cartridge part comprising a reservoir for containing the aerosol precursor material.

2. The aerosol provision device of claim 1, wherein the electrical connection port defines an axis of connection, along which an element associated with the external apparatus is connected to the electrical connection port.

3. The aerosol provision device of claim 2, wherein the electrical connection port can be moved to a state where the axis of connection is non-parallel with a longitudinal axis of the housing.

4. The aerosol provision device of claim 2, wherein, in the first position, the axis of connection is parallel with a longitudinal axis of the housing, and wherein in the second position, the axis of connection is orthogonal to the longitudinal axis of the housing.

5. The aerosol provision device of claim 2, wherein the electrical connection port defines a recess and is configured to receive and electrically couple with a protrusion of the element associated with the external apparatus.

6. The aerosol provision device of claim 2, wherein the element associated with the external apparatus is an electrically conductive cable.

7. The aerosol provision device of claim 1, wherein the bottom surface includes a flat section configured to allow the bottom surface of the aerosol provision device to be placed on a flat surface such that the longitudinal axis of the housing is maintained normal to the flat surface without external support.

8. The aerosol provision device of claim 1, further comprising a connection element, the connection element including the electrical connection port and configured to movably couple to the housing.

9. The aerosol provision device of claim 8, wherein the connection element is configured to rotate relative to the housing about at least one axis of the connection element.

10. The aerosol provision device of claim 1, wherein the housing is configured to receive a cartridge, the cartridge including a reservoir configured to hold a quantity of aerosol precursor material.

11. The aerosol provision device of claim 10, wherein the housing is arranged such that when the cartridge is coupled to the housing, the longitudinal axis of the cartridge is parallel with the longitudinal axis of the housing.

12. The aerosol provision device of claim 1, wherein the aerosol provision device is configured, when coupled to the external apparatus, to supply electrical power from the external apparatus to the electronic circuitry in the housing via the electrical connection port.

13. The aerosol provision device of claim 1, wherein the aerosol provision device is configured, when coupled to the external apparatus, to supply electrical signals representing information from the electronic circuitry in the housing to the external apparatus via the electrical connection port.

14. An aerosol provision system for generating aerosol for user inhalation from an aerosol precursor material, the system comprising:
the aerosol provision device of claim 1; and
the aerosol precursor material.

15. The system of claim 14, further comprising a cartridge for storing the aerosol precursor material, wherein the cartridge is configured to be removably coupled to the aerosol provision device.

16. A connection element for an aerosol provision device for generating aerosol for user inhalation from an aerosol precursor material, the connection element comprising:
an electrical connection port configured to directly couple to an external apparatus, and
a rotatable coupling element configured to rotatably couple the connection element relative to the housing of the aerosol provision device, wherein the electrical connection port is electrically coupled to electronic circuitry in a housing of the aerosol provision device when the connection element is coupled to the housing of the aerosol provision device and wherein the housing includes a bottom surface and a side surface connected to the bottom surface, wherein the electrical connection port is configured to be movable from a first position where the electrical connection port forms part of, and is flush with, the bottom surface of the housing to a second position where the electrical connection port forms part of, and is flush with, the side surface of the housing, wherein the aerosol provision device comprises a reservoir or is configured to couple to a cartridge part comprising a reservoir for containing the aerosol precursor material.

17. A method for coupling an aerosol provision device for generating aerosol for user inhalation from an aerosol precursor material to an external apparatus, the aerosol provision device comprising a housing, electronic circuitry provided within the housing, and an electrical connection port coupled to the electronic circuitry and configured to directly couple to the external apparatus, wherein the housing includes a bottom surface and a side surface connected to the bottom surface, wherein the electrical connection port is configured to be movable from a first position where the electrical connection port forms part of, and is flush with, the bottom surface of the housing to a second position where the electrical connection port forms part of, and is flush with, the side surface of the housing, the method comprising:

electrically coupling the external apparatus directly to the aerosol provision device via the electrical connection port, the electrical connection port being in the first position relative to the housing, and rotating the electrical connection port to the second position, different from the first position, relative to the housing with the external apparatus electrically coupled to aerosol generating device in the second position via the electrical connection port, wherein the aerosol provision device comprises a reservoir or is configured to couple to a cartridge part comprising a reservoir for containing an aerosol precursor material.

18. An aerosol provision means for generating aerosol for user inhalation from an aerosol precursor material, the means comprising:

a housing;

electronic circuitry provided within the housing; and an electrical connection means coupled to the electronic circuitry and configured to directly couple to an external apparatus, wherein the electrical connection means is rotatably mounted relative to the housing, wherein the housing includes a bottom surface and a side surface connected to the bottom surface, wherein the electrical connection means is configured to be movable from a first position where the electrical connection means forms part of, and is flush with, the bottom surface of the housing to a second position where the electrical connection means forms part of, and is flush with, the side surface of the housing, wherein the aerosol provision means comprises a reservoir or is configured to couple to a cartridge part comprising a reservoir for containing an aerosol precursor material.

* * * * *